Jan. 27, 1970 H. W. SCHILLING 3,492,423

ARRANGEMENT FOR TUNING A TELEPRINTER TO THE FREQUENCY OF THE INCOMING SIGNAL

Filed Dec. 4, 1967 4 Sheets-Sheet 1

LEGEND

| | |
|---|---|
| 9 | COINCIDENCE CIRCUIT |
| 10 | SWITCHING AMPLIFIER CIRCUIT |
| 11 | CONTROL STAGE |
| 12 | CONTROL STAGE |
| 13a | ADJUSTING SHAFT |

INVENTOR
HELMUT W. SCHILLING

BY Menotti J. Lombardi

ATTORNEY

INVENTOR
HELMUT W. SCHILLING
BY Menotti J. Lombardi
ATTORNEY

INVENTOR
HELMUT W. SCHILLING

BY Menotti J. Lombardi

ATTORNEY

Jan. 27, 1970 H. W. SCHILLING 3,492,423

ARRANGEMENT FOR TUNING A TELEPRINTER TO THE FREQUENCY OF THE INCOMING SIGNAL

Filed Dec. 4, 1967 4 Sheets-Sheet 4

INVENTOR

HELMUT W. SCHILLING

BY [signature]

ATTORNEY

United States Patent Office 3,492,423

Patented Jan. 27, 1970

3,492,423

ARRANGEMENT FOR TUNING A TELEPRINTER TO THE FREQUENCY OF THE INCOMING SIGNAL

Helmut Wilhelm Schilling, Pforzheim, Germany, assignor to International Standard Electric Corporation, New York, N.Y., a corporation of Delaware Filed Dec. 4, 1967, Ser. No. 687,859
Claims priority, application Germany, Dec. 22, 1966, St 26,285
Int. Cl. H04l 5/24, 7/00, 25/02
U.S. Cl. 178—53.1 9 Claims

ABSTRACT OF THE DISCLOSURE

An arrangement is provided by which the receiving teleprinter can be continuously tuned to the frequency of the incoming signals, with an automatic readjustment being effected in case of frequency variations.

BACKGROUND OF THE INVENTION

In general, the invention relates to an arrangement for determining, at the receiving end, the transmission speed of a machine or hand-keyed sequence of teleprinter signals in the start-stop mode of operation, and adapting the receiver to the determined transmission speed.

In the case of certain types of radio teleprinter services, telegraph signals of unknown, different, or varying signal frequencies must be received and evaluated. This requires, for each signal frequency expected, at least one separate teleprinting machine or a corresponding receiving equipment. For transmissions of unknown or varying signal frequencies, it is necessary to employ apparatus which must be manually adjusted and which, because of the necessity of separate supervision, are not economical.

The disadvantages of the known systems can be avoided by employing the arrangement according to the present invention, whereby a teleprinting machine or device, operating according to the principles outlined herein, is rendered universally applicable, thereby requiring a minimum expenditure on operating controls.

SUMMARY OF THE INVENTION

The arrangement is characterized by the fact that from the train of pulses of each incoming telegraph signal, independently of the density of the signal sequence, there is determined the average resultant timing frequency; that the receiving equipment, primarily including a mechanical or electronic serial-to-parallel converter, is tuned to the determined timing frequency (sequence); and that the operating cycle of the evaluating equipment, independently of the receiving equipment, is operated at a constant speed from which is determined the upper limit of the receiving range.

BRIEF DESCRIPTION OF THE DRAWINGS

The arrangement according to the invention will now be explained in detail in connection with the following drawings in which:

Referring to FIG. 1, the arriving telegraph signal elements are applied via connecting terminals 1*a* to an input stage 1, which may be designed as a trigger stage with a firmly adjusted or adjustable selector shaft. In case of a galvanical separation between the telegraph circuit and the subsequently following electronic circuit, a ring modulator may be provided, and a switching means for suppressing noise pulses is provided if required. The signal pulses (FIG. 2*a*) as regenerated by the stage 1 are applied via line 1*b*, to the serial-to-parallel converter 2 which includes switching means for controlling the printing mechanism 15, to a start-stop switching stage 3, and to a differentiating stage 5.

Figure 1:
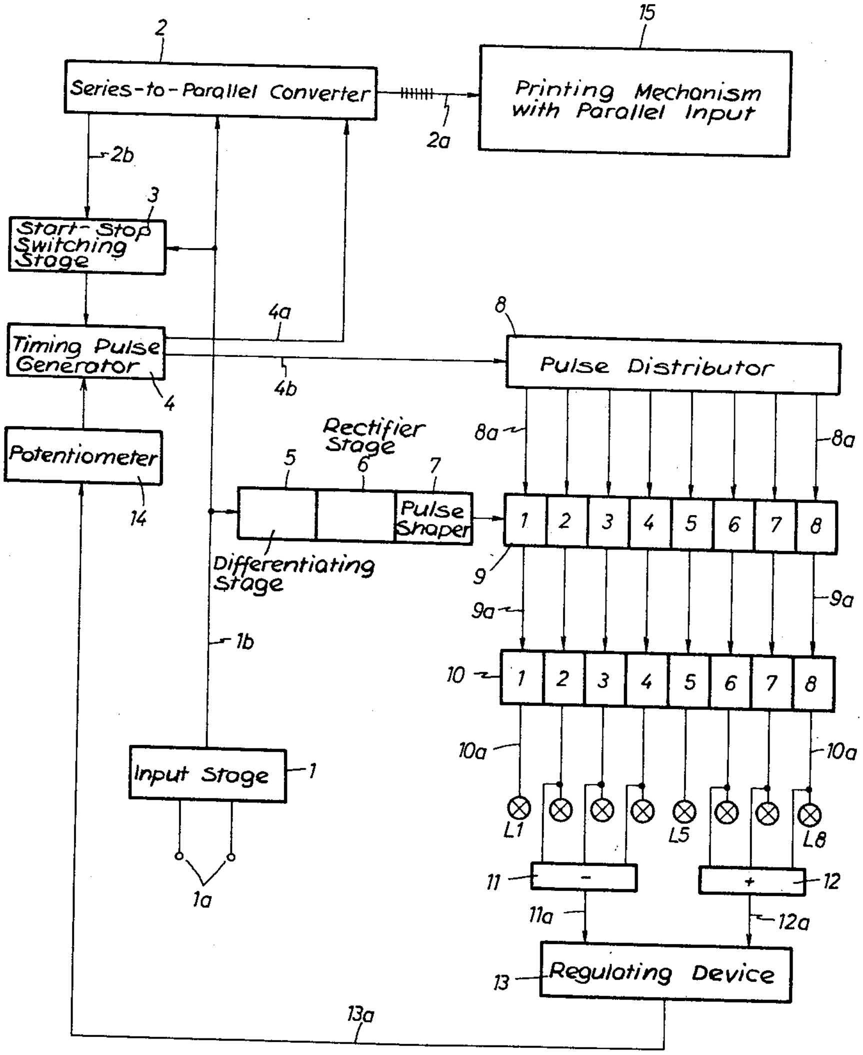
FIG. 1 shows the block diagram of an arrangement according to the invention.

By the leading edge of each telegraph signal, the switching stage 3 is brought into a circuit condition in which it releases a timing or clock pulse generator 4 to cause oscillation (FIG. 2*d*). The clock pulse generator 4 serves as a source of pulses for the serial-to-parallel converter 2 and also for pulse distributor 8, of the frequency control circuit to which it is connected, via the control leads 4*a* and 4*b* respectively.

Differentiating stage 5 evaluates the sequence of the incoming telegraph signal elements, including the voltage transient or surge of the start element, by generating a needle pulse upon each change of signal condition (FIG. 2*b*). These pulses, via a rectifier stage 6, are fed to a pulse shaper 7 which, at the intervals of the needle pulses, in turn each time momentarily releases the gates 9/1 to 9/8 of the coincidence circuit 9 (FIG. 2*c*). This time of release, in the normal case, corresponds to the pulses as generated by the distributor 8 which, under the control of the clock pulse generator 4, successively open the coincidence gates 9/1 to 9/8 (FIG. 2*b*) via output lines 8*a*.

Figure 2:
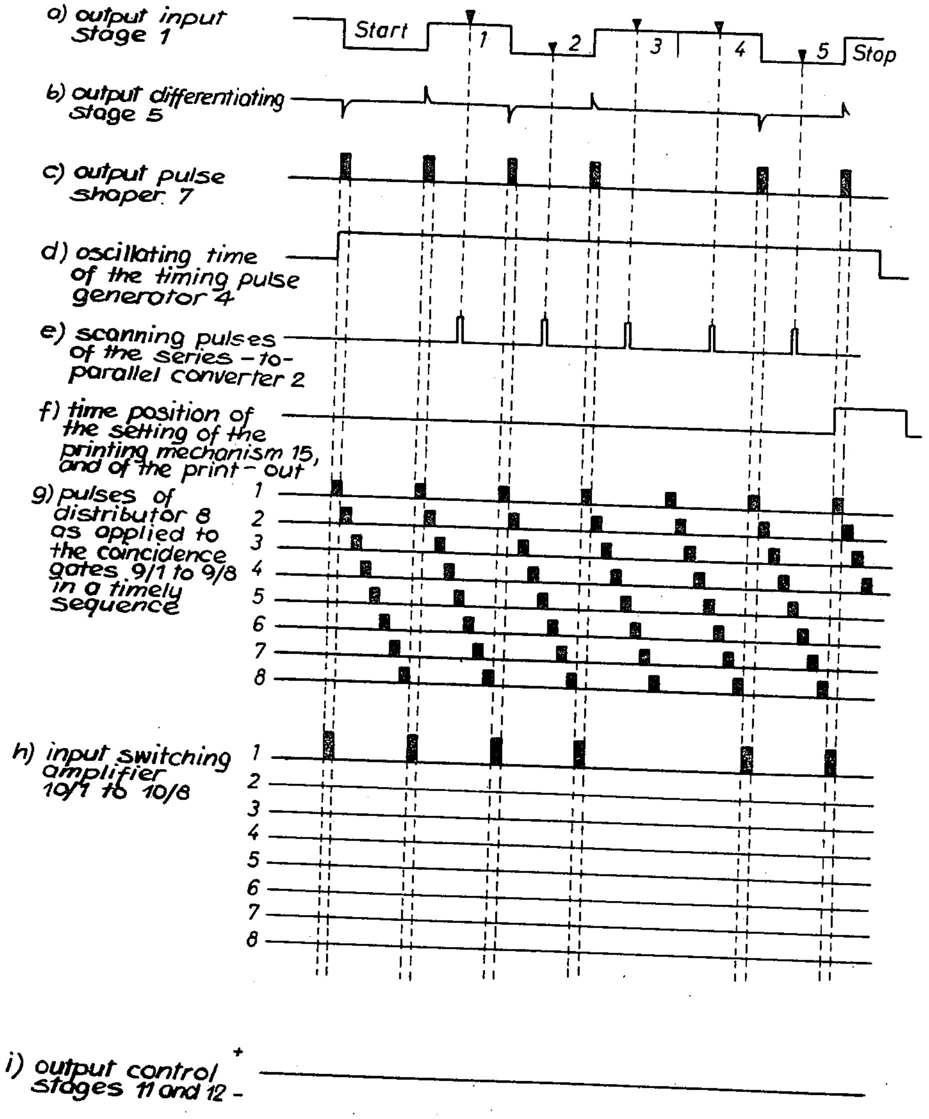
FIG. 2 shows a pulse diagram helpful in explaining the arrangement of FIG. 1 when the receiving equipment is properly adjusted to the received signal frequency.

The sum of the eight successive pulses, by considering the frequency as adjusted via the clock pulse generator 4, results each time in the length of one signal pulse. This implies that, in the case of agreement between the frequency of the clock pulse generator 4 and that of the incoming telegraph signals, the sum of the eight distributor pulses is equal to the length or duration of one signal pulse (FIG. 2). However, if the frequency of the timing or clock pulse generator 4 deviates from that of the signals to be evaluated, then the sum of the eight distributor pulses is either correspondingly shorter (clock pulse generator frequency higher, FIG. 3) or longer (clock pulse generator frequency lower). These criteria are used in the manner to be described in detail hereinafter, for determining the amount of mutual deviation.

Since each telegraph signal element is used in this method for the purpose of forming the frequency, there is automatically also effected a consideration of e.g. distorted signals in which the pulse lengths deviate from one another. In these cases a medium (mean) frequency is derived from the sum of deviations, by which there is achieved the optimum position of the scanning time positions with respect to the entirety of the signal pulses.

Figure 4:
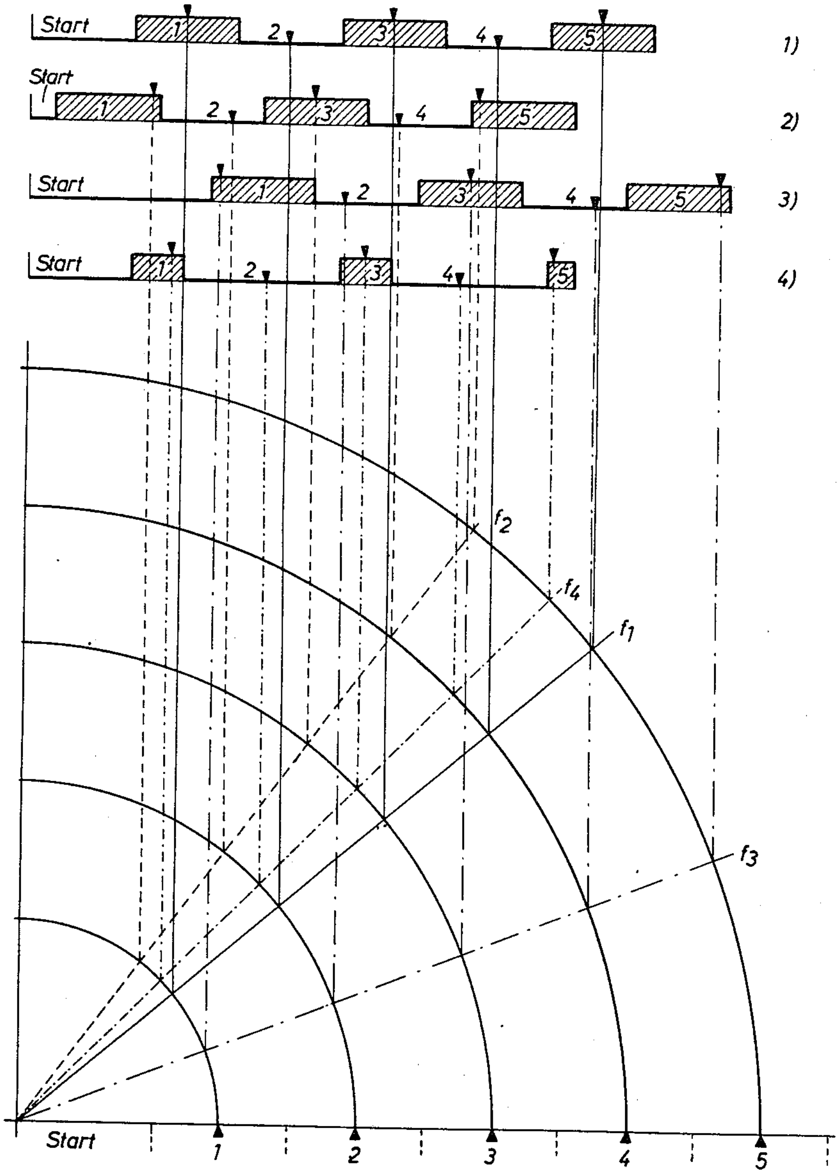
FIG. 4 shows in diagram form the position of the individual scanning time positions for differently distorted pulse combinations, at the time position of the effected adjustment of the receiving equipment to the respective determined timing frequency.

This is shown in FIG. 4, in which on the abscissa there is plotted the constant relationship of the scanning pulses in relation to one another and with respect to time. Through these points extend circles which all have the point "start" as their center. Each radial beam represents as a parameter a predetermined timing frequency $f_1$ to $f_4$ which has been determined as the medium (mean) frequency from the pulse sequences 4/1 to 4/4.

As already stated, the coincidence gates 9/1 to 9/8 are controlled, upon release of the clock pulse generator 4 by the leading edge of an incoming signal, successively by the eight distribution pulses. Parallel in relation thereto, the same gates are momentarily released by the pulses of the pulse shaper 7 as derived from the voltage transients or surges of the signal element sequence, so that the gates are opened in the event of coincidence.

In the case of agreement between the frequency of the incoming signal and the clock pulse generator 4 (FIG. 2), the condition of coincidence is met with respect to the gate 9/1 only. Accordingly, only on output lead 9*a* of the gate 9/1 will a pulse appear which, by means of switching amplifier 10/1 of switching amplifier circuit 10, is fed to a signal lamp L1, which is momentarily lit in accordance with the length or duration of the pulse. By the timely sequence of these pulses at a spaced relationship of about 40 ms. (a mean telegraph speed and average element shift number) there will appear a slight flickering of signal lamp L1. Since lighting of this lamp indicates that the receiver frequency is in agreement with that of the received telegraph signals, it is advisable to provide this lamp with a special indication e.g. a green light.

Figure 3:
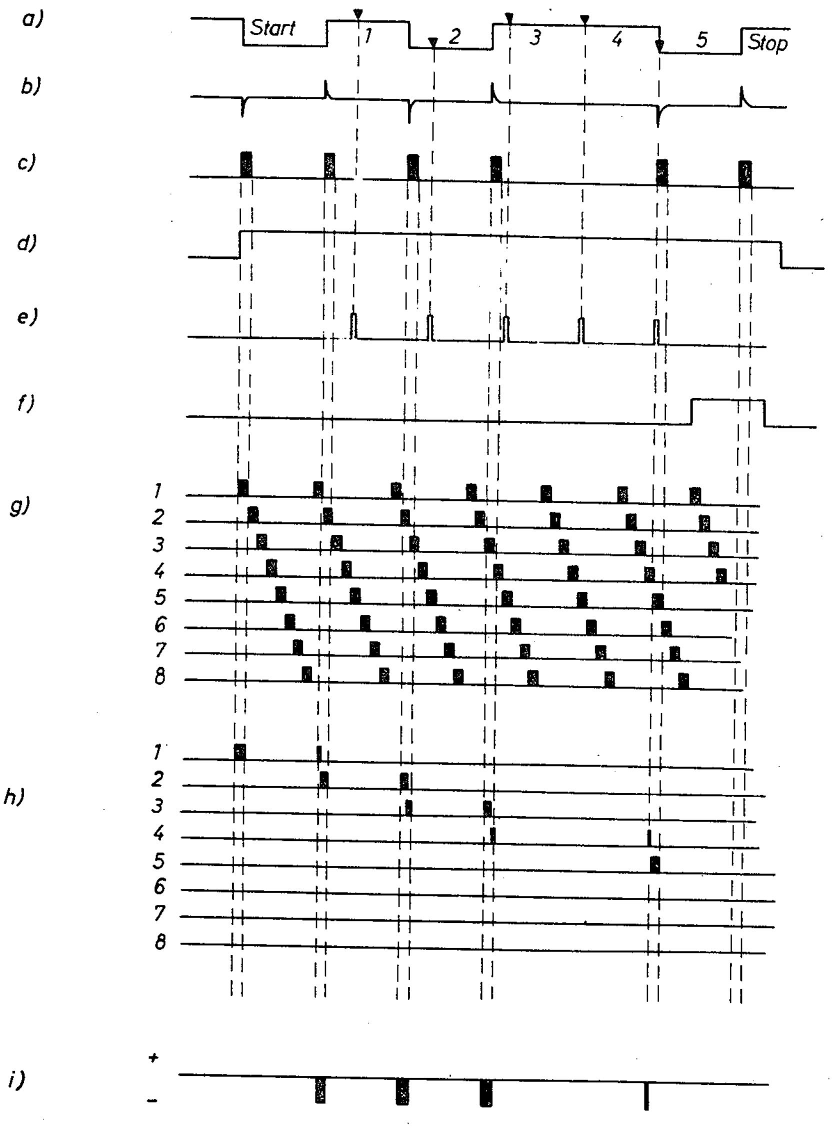
FIG. 3 shows a pulse diagram of the arrangement according to FIG. 1 at a time position in which the timing frequency of the receiving equipment is higher than that of the received signals.

If, however, the frequency of the timing pulse generator 4 is higher or lower than that of the received telegraph signals, then the coincidence condition, owing to the displacement between the pulses from the pulse shaper 7 (FIG. 3*c*) and the distribution pulses (FIG. 3*g*), as resulting from the frequency difference, and quite depending on the magnitude of frequency deviation, is instead now met with respect to one or more of the gates 9/2 to 9/8. The pulses of different width which appear at the outputs of these gates, are applied, via their associated switching amplifier 10/2 to 10/8, and the output leads 10*a*, to the respective indicating circuit signal lamps L2 to L8. These lamps, depending on the density and the width of the pulses applied thereto, display a more or less strong flickering light. The lighting of the lamps L2 to L4 indicate an excessively high cadence speed as is illustrated in FIG. 3, whereas the lighting of lamp L6 to L8 occurs whenever the timing pulse generator frequency is too low. This latter case is not shown in detail because it, with the exception of an opposite sign, is performed in absolutely the same way as shown in FIG. 3.

In each of the aforementioned cases the green signal lamp L1 will also be lit, as can be recognized from FIG. 3*h*, because the release of the timing pulse generator 4 is effected each time by the leading edge of each signal pulse, so that deviations cannot yet be detected at this time position. Whereas the pulses applied to the signal lamps L2 to L4 and L6 to L8 provide an unambiguous display regarding the direction and the amount of frequency deviation, the directional assignment of the pulse applied to the lamp L5 is uncertain (FIG. 3*h*). The lighting-up of this lamp, therefore, should be indicated by red light.

With a manual regulator, the frequency of the timing pulse generator 4 is capable of being adjusted, since it would now be possible to tune, in a visual manner the receiver's natural frequency to that of the transmitted frequency.

Due to the direction-oriented display of the pulses as applied to the lamps L2 to L4 and L6 to L8, these pulses can also be utilized for the purpose of constituting an electrical shifting or rearrangement instruction. To accomplish this, the switching amplifiers 10/2 to 10/4 and 10/6 to 10/8 (FIG. 1) are connected, via the associated lines 10*a*, to the control stage 11 or 12 respectively, which are designed as OR-circuits. The right and left instructions (FIG. 3*i*), appearing at their outputs, are fed via control leads 11*a* and 12*a* to a regulating device 13 which may be a DC servomotor arranged in the diagonal of a bridge circuit. With respect to the pulses of the control stages 11 and 12, this motor has an integrating effect, and serves to drive a potentiometer 14 by means of a schematically shown adjusting shaft 13*a*. Therefore, by this potentiometer 14, the control voltage for the frequency determination is fed to the timing pulse generator 4.

In the event of an interruption of the intelligence flow, as is the case in manual or hand-keying, or in fading reception or power failure, the last-frequency adjustment will be maintained.

Since the extent of the shifting or adjusting instruction is determined not only by the amount of deviation from the rated or nominal value, but also by the number of voltage transients or surges appearing in one telegraph signal, there is not provided a genuine proportional behaviour of the regulating device 13. The converging of the regulator, however, is free from transients or surges because, upon approaching the nominal or rated value, the pulses as constituted by the control stages 11 and 12, proceed towards zero with respect to their timely expansion.

When the tuning of the timing pulse generator 4 to the incoming signal frequency is completed, a sequence of pulses therefrom, corresponding to that frequency, is applied to the serial-to-parallel converter 2 while the control lead 4*a*, with the scanning time positions as determined by these pulses, has an optimum position adapted to the respective conditions or requirements (FIG. 2*e*).

After storage of the combination elements in the serial-to-parallel converter 2 has been performed, there is effected in the stop element, via the parallel inputs 2*a*, the restoring to the adjusting elements of the printing mechanism 15 and the starting of the printing process (FIG. 2*f*). At the same time, and by the action of a pulse from the serial-to-parallel converter 2 via the control lead 2*b*, the start-stop switching stage 3 is returned to its normal condition, which in turn, switches off the timing pulse generator 4 (FIG. 2*d*).

In order to make it possible to effect a readjustment of the frequency at the receiving end, there is eliminated in the present arrangement the rigid coupling of the mechanical series-to-parallel converter to the printing mechanism which is customary with mechanical types of teleprinters. Whereas the series-to-parallel converter, irrespective of whether it is of the mechanical or electronic type, is capable of being regulated by the timing frequency in accordance with the invention described herein, the printing mechanism 15, with respect to its priming system, represents an independent unit. This unit operates constantly at its maximum possible speed, and by which, there is determined at the same time the range of reception. Accordingly, all characters falling within this range of reception are printed out at the same speed, and only the intervals between the individual printing cycles become shorter as the receiving frequency increases.

I claim:

1. An arrangement for determining, at the receive end, the transmission speed of teleprinter signals in the start-stop mode of operation, and for adapting the receiving equipment to the thus determined transmission speed, comprising:

(a) a source of incoming telegraph signals, each signal thereof consisting of a sequence of pulses;

(b) a serial-to-parallel converter coupled to said source of incoming signals;

(c) means, coupled to said serial-to-parallel converter, for evaluating the signals received therefrom, said evaluating means having an operating speed which is independent of said receiving equipment and which determines the upper limit of the receiving range thereof;

(d) timing pulse generating means, coupled to said serial-to-parallel converter and operatively coupled to said signal source, for controlling the frequency of operation of said converter;

(e) means, coupled to said source of signals and to said timing pulse generating means, for determining the resultant average timing frequency of said incoming signals, in relation to the frequency of operation of said generating means, independently of the density of the sequences of pulses of said incoming signals; and (f) control means, coupled to said generating means and to said frequency determining means, for automatically regulating the frequency of operation of said generating means in accordance with the frequency determination of said incoming signals, causing in response thereto said converter to be correspondingly regulated, as to its frequency of operation, to the frequency of said incoming signals.

2. The arrangement according to claim 1 wherein said frequency determining means include a coincidence circuit coupled to said control means, a pulse distributor, coupled to said coincidence circuit and to said timing pulse generating means, for successively priming said coincidence circuit by means of a plurality of *n* outputs under the control of said timing pulse generating means, and responsive means, coupled to said source of incoming signals and to said coincidence circuit, for providing a shaped pulse output each time there is a voltage shift between incoming signal elements, said shaped pulses causing each time a release of said coincidence circuit upon coincidental arrival thereat of a pulse from said pulse distributor.

3. The arrangement according to claim 2 wherein said responsive means include a differentiating stage, coupled to said source of incoming signals, for providing a needle pulse output upon each change of incoming signal condition, a rectifier stage coupled to said differentiating stage, and a pulse shaper, coupled to said rectifier stage and to said coincidence circuit for producing shaped pulses at the intervals of said needle pulses.

4. The arrangement according to claim 2 wherein said coincidence circuit is comprised of a plurality of *n* coincidence gates, corresponding to said plurality of pulse distributor outputs, each of which provides an output pulse upon the simultaneous arrival of input pulses from said pulse distributor and the pulse shaper stage of said responsive means, the activation of each coincidence gate being representative of the amount of deviation between the frequency of operation of said timing pulse generating means and the frequency of the incoming signals.

5. The arrangement according to claim 4 wherein said control means includes a plurality of *n* indicating circuits each of which is operatively coupled to one of said plurality of coincidence gates, said plurality of indicating circuits including: a first circuit for indicating, upon activation by its corresponding coincidence gate, zero deviation between the frequency of operation of said timing pulse generating means and the frequency of said incoming signals; a second circuit for indicating, upon activation by its corresponding coincidence gate, a deviation in frequency between said generating means and said incoming signals, with the direction of deviation thereof being uncertain; third indicating circuits, consisting of ½ $(n-2)$ number of said plurality of indicating circuits, for indicating deviation in frequency between said generating means and said incoming signals, with the direction of deviation thereof being certain and in the first of two directions and the amount of deviation being unambiguous; and fourth indicating circuits, consisting of ½ $(n-2)$ number of said plurality of said indicating circuits, for indicating a deviation in frequency between said generating means and said incoming signals, with the direction of deviation thereof being certain and in the other of said two possible directions, and the amount of deviation being unambiguous.

6. The arrangement according to claim 5 wherein said control means further include first and second control stages, coupled respectively to said third and fourth indicating circuit groups, for generating frequency correction instructions in accordance with the determined direction and amount of frequency deviation as indicated by the outputs of the corresponding coincidence gates, and regulating means, coupled to said control stages and to said timing pulse generating means, for automatically adjusting the frequency of operation of said timing pulse generating means in accordance with the correction instructions received from said control stages.

7. The arrangement according to claim 6 wherein said regulating means include a potentiometer coupled to said timing pulse generating means and a regulating device coupled to said potentiometer by means of an adjusting shaft.

8. The arrangement according to claim 2 wherein the time interval of the sum of a set of successive pulses from said pulse distributor is substantially equal to the time duration of an incoming signal element whenever the frequency of operation of said timing pulse generating means is the same as the frequency of the incoming signals.

9. The arrangement according to claim 1 wherein the frequency of said timing pulse generating means is capable of being manually adjusted.

References Cited

UNITED STATES PATENTS

| | | | |
|---|---|---|---|
| 2,405,597 | 8/1946 | Miller. | |
| 2,689,881 | 9/1954 | Leypold. | |
| 2,749,386 | 6/1956 | Wright | 178—53.1 |
| 3,112,363 | 11/1963 | Schramel et al. | 178—53.1 |
| 3,209,265 | 9/1965 | Baker et al. | 328—72 |
| 3,388,216 | 6/1968 | Brooke et al. | 178—53.1 |

THOMAS A. ROBINSON, Primary Examiner

U.S. Cl. X.R.

178—23, 69, 69.5; 340—168